United States Patent [19]

Wang

[11] Patent Number: 5,465,750
[45] Date of Patent: Nov. 14, 1995

[54] TWO-STAGE REGULATOR

[75] Inventor: Yushan Wang, Howell, N.J.

[73] Assignee: Standard Keil Industries, Inc., Allenwood, N.J.

[21] Appl. No.: 243,968

[22] Filed: May 17, 1994

[51] Int. Cl.⁶ ................................................ G05D 16/06
[52] U.S. Cl. ...................... 137/484.8; 137/505.11; 137/505.12; 137/505.42; 137/507
[58] Field of Search ............... 137/505.11, 505.12, 137/484.8, 507, 505.42

[56] References Cited

U.S. PATENT DOCUMENTS

| 2,057,150 | 10/1936 | Kehl et al. | 137/505.12 |
|---|---|---|---|
| 2,288,733 | 7/1942 | Neisemann | 137/484.8 |
| 2,313,149 | 3/1943 | Jacobsson | 137/505.12 X |
| 2,639,730 | 5/1953 | Carter | 137/507 X |
| 2,747,607 | 5/1956 | Matasouic | 137/505.11 |
| 3,100,504 | 8/1963 | Kauer | 137/505.42 |

FOREIGN PATENT DOCUMENTS

| 0298272 | 1/1989 | European Pat. Off. | G05D 16/06 |
|---|---|---|---|
| 0465397 | 1/1992 | European Pat. Off. | G05D 16/06 |
| 0517190 | 12/1992 | European Pat. Off. | A16M 13/00 |
| 2073853 | 10/1981 | United Kingdom | G05D 16/06 |
| 2089954 | 6/1982 | United Kingdom | F17C 13/04 |
| 2127941 | 4/1984 | United Kingdom | F16K 13/04 |
| 2139325 | 11/1984 | United Kingdom | G05D 16/06 |
| 2101717 | 5/1985 | United Kingdom | G05D 16/06 |
| 2131702 | 4/1986 | United Kingdom | B63C 11/02 |
| 2175980 | 2/1989 | United Kingdom | G05D 16/04 |

OTHER PUBLICATIONS

European Patents Abstracts, Week 9201, p. 97, EP 462583A—Honeywell.
European Patents Abstracts, Week 9110, p. 233, EP 415784A—DuPont.
British Patent Office, Offical Journal, Oct. 10, 1984, p. 839, GB 1,543,546—Honeywell.

Primary Examiner—Stephen M. Hepperle
Attorney, Agent, or Firm—Schweitzer, Cornman & Gross

[57] ABSTRACT

A two-stage regulator includes first and second regulator units in series. The regulator units are mounted upon a unitary base which forms the lower portion of each regulator and includes the inlets and outlets for each regulator unit as well as a passageway between the units. Each of the regulator units is of the diaphragm and main spring type. The first regulator unit, which operates upon the input high-pressure flow, includes a valve assembly proximate the diaphragm. The second regulator unit, which decreases the pressure of the intermediate pressure flow to the final low-pressure outlet flow includes a stem mounted to the diaphragm which terminates at a valve assembly displaced from the diaphragm body. In a preferred embodiment, the surface area of the low-pressure regulator unit is approximately 25% greater than the surface area of the high-pressure unit. The pressure control system of the second regulator unit may also include a nozzle assembly to increase the velocity of the exiting gas and a aspirator tube which utilizes the high velocity gas to modulate the diaphragm. Such a construction can provide high accuracy and rapid response of the system.

23 Claims, 4 Drawing Sheets

TWO-STAGE REGULATOR

The present invention relates to the mechanical arts and in particular to a new and improved regulator device for controlling the pressure of compressed gases.

BACKGROUND OF THE INVENTION

The use of spring-biased diaphragm regulators for controlling the flow of gases under pressure is well known. Such devices allow the pressure of a supplied gas to be controlled and maintained at a generally consistent pressure, irrespective of changes in the source pressure. Conventional regulators, however, often do not respond quickly enough to system needs, thus causing a dramatic pressure drop in response to the flow requested by the system. In addition, often times the regulation provided by conventional regulators is insufficiently precise; the outlet pressure drifts with inlet pressure changes.

It is accordingly a purpose of the present invention to provide a regulator assembly which exhibits rapid response to the system flow needs with minimum pressure drop.

Another purpose of the present invention is to provide a regulator which exhibits high precision in maintenance of the regulated pressure.

Still another purpose of the present invention is to provide a regulator which utilizes a pair of diaphragm units in series to obtain improved performance.

Yet another purpose of the present invention is to provide a dual diaphragm regulator of an efficient and economical construction.

BRIEF DESCRIPTION OF THE INVENTION

In accordance with the above and other purposes and objects, the regulator assembly of the present invention comprises a unitary body forming the base for a pair of regulator units having spring-biased control diaphragms. The regulator units are in a series relationship. The first regulator is of a design particularly adapted to operate at high pressure, and is configured with a relatively small diaphragm and valve entranceway to minimize load of main spring during operation. The second regulator is particularly adapted for consistent regulation over a range of flow rates, and includes a large diameter diaphragm coupled to a valve mechanism displaced from the diaphragm which provides for a large flow rate and precise metering thereof.

The low-pressure regulator portion includes an exit port nozzle followed by an aspirator hole to create a low-pressure zone incorporating the lower regulator chamber which allows the valve assembly to open to a greater degree to provide increased flow with minimum pressure drop across the regulator during operation. A quad ring seal between valve stem and diaphragm chamber insures that the lower regulator chamber is coupled to the gas flow solely through the aspirator hole.

The same molded bonnets may be used for the high and low stages of the regulator. A female threaded bonnet is used on the high pressure side, providing a relatively smaller diaphragm; while a male threaded bonnet is used on the low pressure side, allowing a diaphragm which is about 25% larger than the high pressure side diaphragm to be used with the same bonnet configuration. Use of a smaller diaphragm reduces the load of the main regulator spring and thus the load on the bonnet on the high pressure side. The larger diaphragm on the low pressure side allows for increased sensitivity and flow rate of the regulator.

The simple design of the valve assembly utilized on the low pressure side incorporates a simple gate mechanism which uses minimum parts and machining to isolate the resulting low pressure flow from the high pressure input, and provides a holder for a bias spring.

A combination of internal and external safety fittings allows one of the regulators to meet European double-safety requirements. The internal safety, which is virtually immune from tampering insures that at least one safety is in place at all times. If a single safety is required the port for the external safety can be converted to an outlet port or can be simply plugged.

The unitary regulator base may be provided with apertures connected to the primary gas flow path to allow various points in the pressure control process and pressure-sensitive relief means to be employed to permit monitoring apparatus, such as gauges, to be connected to the regulator as well as to allow the parallel connection of additional regulator assemblies as may be desired.

BRIEF DESCRIPTION OF THE DRAWINGS

A fuller understanding of the present invention and the objects and purposes thereof will be obtained upon review of the following detailed description of a preferred, but nonetheless illustrative embodiment of the invention, when considered in conjunction with the annexed drawings, wherein.

DESCRIPTION OF THE INVENTION

Figure 1:
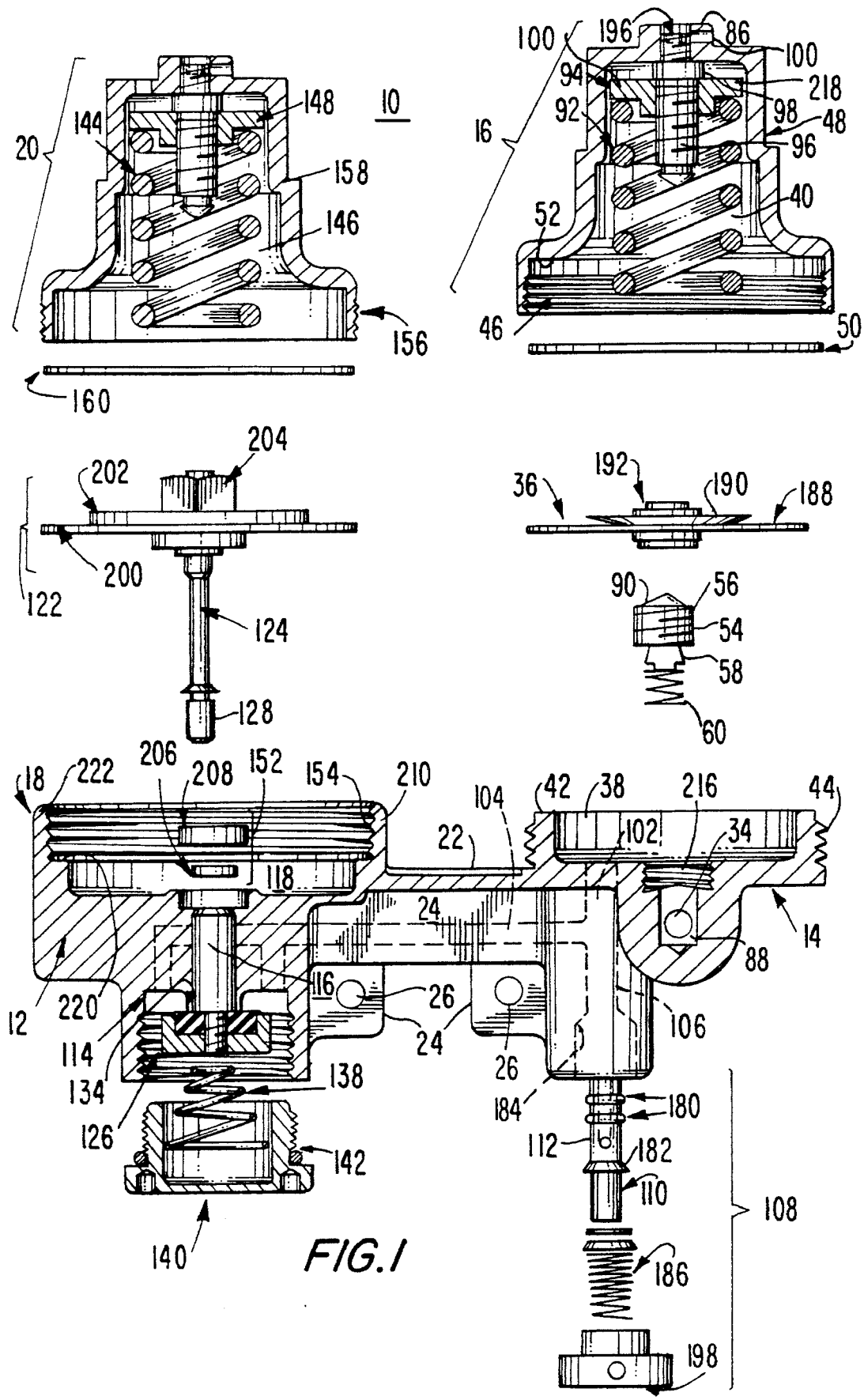
FIG. 1 is an exploded elevational section view of the present invention.

As depicted in the Figures, the regulator assembly 10 of the present invention comprises a main body 12 which includes the lower portion 14 of the housing for first, high-pressure, regulator unit 16, as well as the lower portion 18 of the housing for second, low-pressure regulator unit 20. Intermediate body portion 22 of main body 12 joins the two lower regulator portions, and includes an integral depending mounting flange 24 provided with a pair of throughbores 26 to allow mounting of the regulator assembly on an appropriate post or similar structure. Intermediate section 22 further includes internal gas passageways as will be subsequently discussed. As known in the art, main body 12 may be formed of cast and machined brass or other appropriate material.

Figure 2:
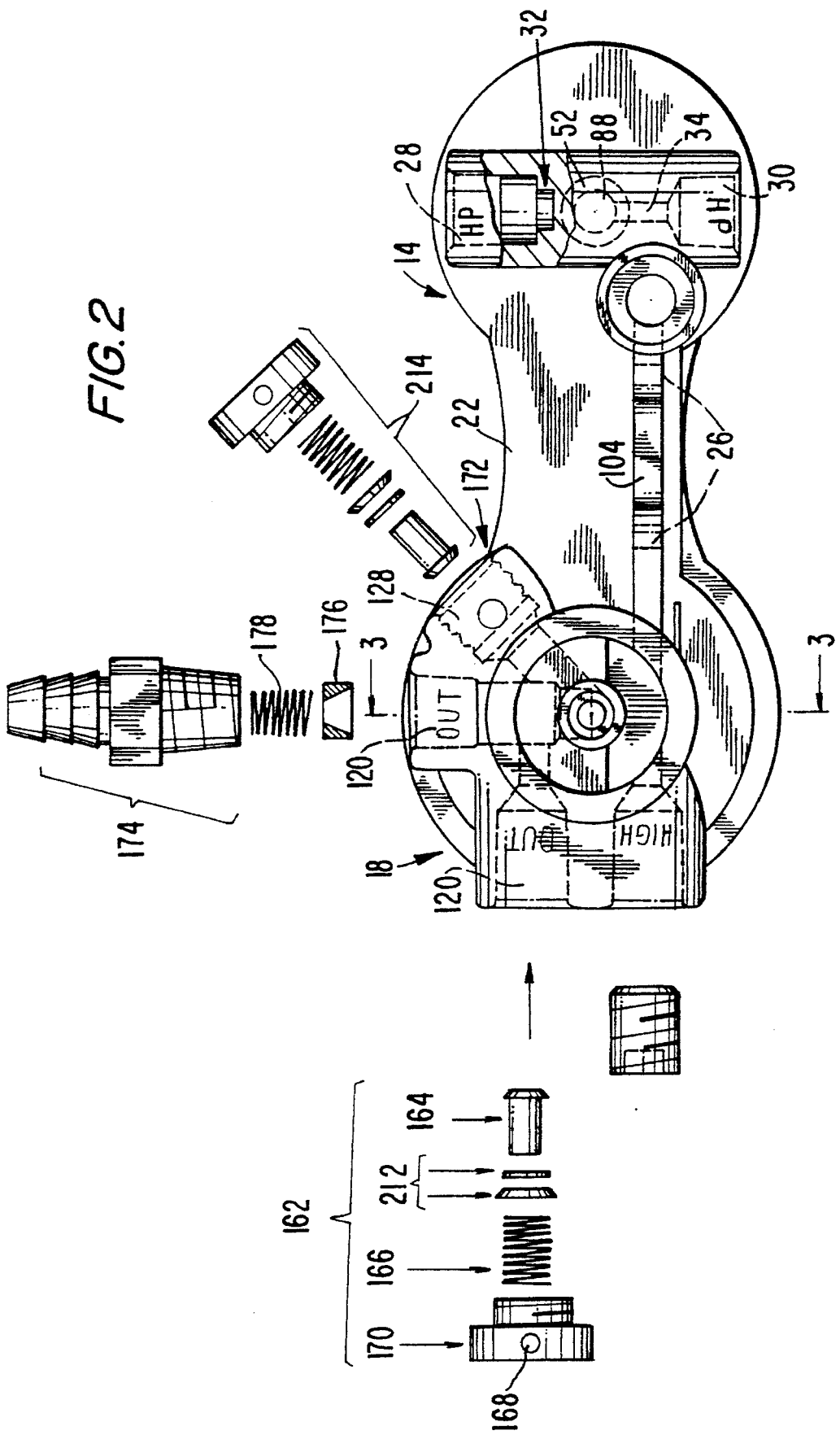
FIG. 2 is a bottom plan view thereof.

As best seen in FIG. 2, high-pressure gas to be regulated is introduced into the regulator assembly 10 through high-pressure entrance port 28 formed into the lower portion 14 of main body 12. The port may be provided with a filter 32. Entrance port 28 is in parallel through duct 34 with a second, opposed entrance port 30, also located in the lower portion 14, which port may be utilized for receipt of a pressure gauge or parallel connection to another regulator assembly. Alternatively, the port may be plugged. The entrance ports 28, 30 lead through duct 34 to first regulator unit 16.

Regulator unit 16 includes diaphragm unit 36 of a conventional construction comprising a flexible membrane 188, a rigid backing member 190, and a core assembly 192, which divides the interior of the regulator unit into a lower chamber 38 and upper chamber 40. The outer periphery of the diaphragm 36 sits on the top surface 42 of portion 14. A set of external threads 44 about portion 14 engage mating internal threads in upper regulator housing or bonnet 48, which is threaded upon the lower portion retaining the diaphragm 36 and accompanying washer 50 therebetween. The bonnet 48 is formed with an internal shoulder 52 which bears against the washer, and secures the diaphragm and washer in place, creating a gas-tight fit between the upper and lower regulator portions, thus defining the upper and lower regulator chambers.

Figures 4, 4A:
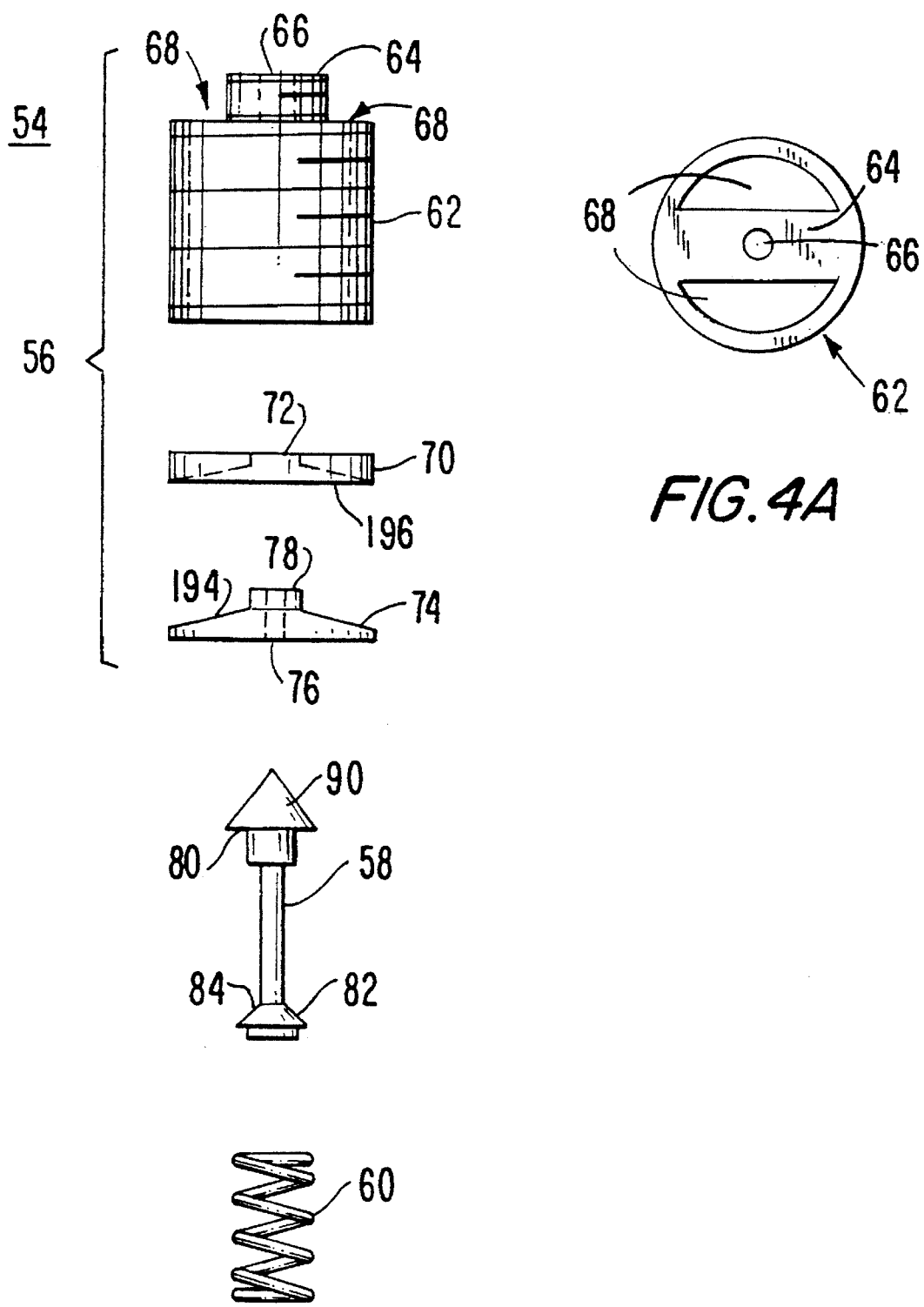
FIGS. 4 and 4a are an exploded elevation view and a top plan view, respectively, of the high-pressure regulator valve of the invention.

The lower chamber 38 of the regulator unit includes a stepped central bore 216 in communication with the main portion of the lower chamber 38 and the entrance port 34. The upper portion of the bore is threaded and receives valve assembly 54. As shown in FIGS. 4 and 4a, the valve assembly comprises cylindrical valve seat system 56 through which plunger 58, biased by spring 60, extends. Valve seat system 56 includes hollow threaded valve body 62, the top end of which includes crossbar 64 having bore 66 to support the upper end of plunger 58. Seat outlet ports 68 are defined on the opposite sides of the crossbar. The valve body is threaded into the upper portion of the bore 216.

The lower end of the valve body is capped by end plate 70 with throughbore 72 aligned with the upper bore 66. Resilient sealing member 74 has central, upwardly-extending shoulder 78 which fits into the bore 72, and which includes bore 76 aligned with bore 66. The upper surface 194 of sealing member 74 is tapered, and mates with a receiving taper 196 in end plate 70, providing a gas-tight seal between the seat assembly and the regulator body. Plunger 58 extends through the aligned bores, and is provided with a main head portion 80 dimensioned to fit in crossbar bore 66, the enlarged top portion of the head 90 limiting downward travel of the plunger. The lower end of the plunger comprises tail 82 having tapering portion 84 adapted to seal and engage the bore 76 in sealing member 74. Vertical motion of the plunger varies the spacing between the plunger tail and bore 76, providing for a metering of gas up through the valve assembly. Upward sealing bias of the plunger against the sealing member is provided by seat spring 60 which fits in the lower portion 88 (see FIG. 1) of bore 216 in the body portion 14.

With reference to FIG. 1, it can be seen that the upper tapered end 90 of plunger head 80 engages with the center portion of the core assembly 192 of diaphragm 36, which includes a neoprene seat (not shown) to accept the plunger end while providing a gas-tight seal between the plunger and diaphragm. With contact between plunger and diaphragm being maintained, any vertical motion of the diaphragm is passed to the plunger, varying the flow of gas through the valve assembly and into the lower chamber 38.

The motion of the diaphragm 36 is under the influence of main spring 92, counteracting the pressure of the gas metered into the lower chamber and the force of seat spring 60, transmitted upwardly through the plunger.

The degree of compression of main spring 92, and thus the downward force exerted against the diaphragm 36, is provided by adjustment assembly 94, which includes threaded shaft 96 having an integral thrust washer 98 which bears against the lower surface of the top of the upper housing 48. Threaded bushing 218, which is constrained against rotation within the upper chamber, rides up and down with rotation of the shaft, varying the compression of the spring 92 as required. Typically, the upper end of the shaft 96 may be recessed within a projecting flange or shoulder 86, and may be provided with an appropriate socket 196 for access by an adjustment tool. A transverse threaded bore 100 may be provided in the side wall of the flange for a setscrew to lock the shaft in place.

Upon setting of the compression of main spring 92, diaphragm 36 and plunger 58 assume an initial equilibrium position, variation thereof being controlled by the force exerted on the diaphragm by the gas metered into the lower chamber 38. The motion of diaphragm 36 in response to such pressure varies the displacement of plunger 58, controlling the gas flow and thus maintaining the pressure of the gas passing through the regulator.

After being metered into the lower chamber 38, the gas exits the chamber through depending exit port 102 in the portion 14, and passes through longitudinal bore passageway 104 in intermediate body portion 22 to the second regulator 20. Exit port 102 also may include a portion 106 which extends beyond the intersection with passageway 104 to allow use of safety 108. Safety 108 includes a hollow stem 110 with an open top end connected to lateral exit ports 112. O-rings 180 provide a gas-tight seal between the upper end of the stem and the exit port 102, while stem flange 182, which is biased against shoulder 184 by spring 186 and cover 198, threaded into the body portion 14, seals the lower end of the stem within the extension 106. So inserted, the exit bores 112 are aligned with longitudinal passageway 104, allowing the metered gas to flow to the second regulator unit.

With an over-pressure situation, however, the sealing bias on the stem by spring 186 is overcome by the gas pressure, and the stem moves downward. Stem flange 182 becomes displaced from shoulder 184, allowing the gas to vent to the atmosphere through vents in cover 198. When normal operating pressure is reestablished, the stem returns to its normal position, sealing the exit port from the atmosphere and reestablishing flow through passageway 104. Such a device may be constructed in accordance with U.S. Pat. No. 4,569, 208.

Figure 3:
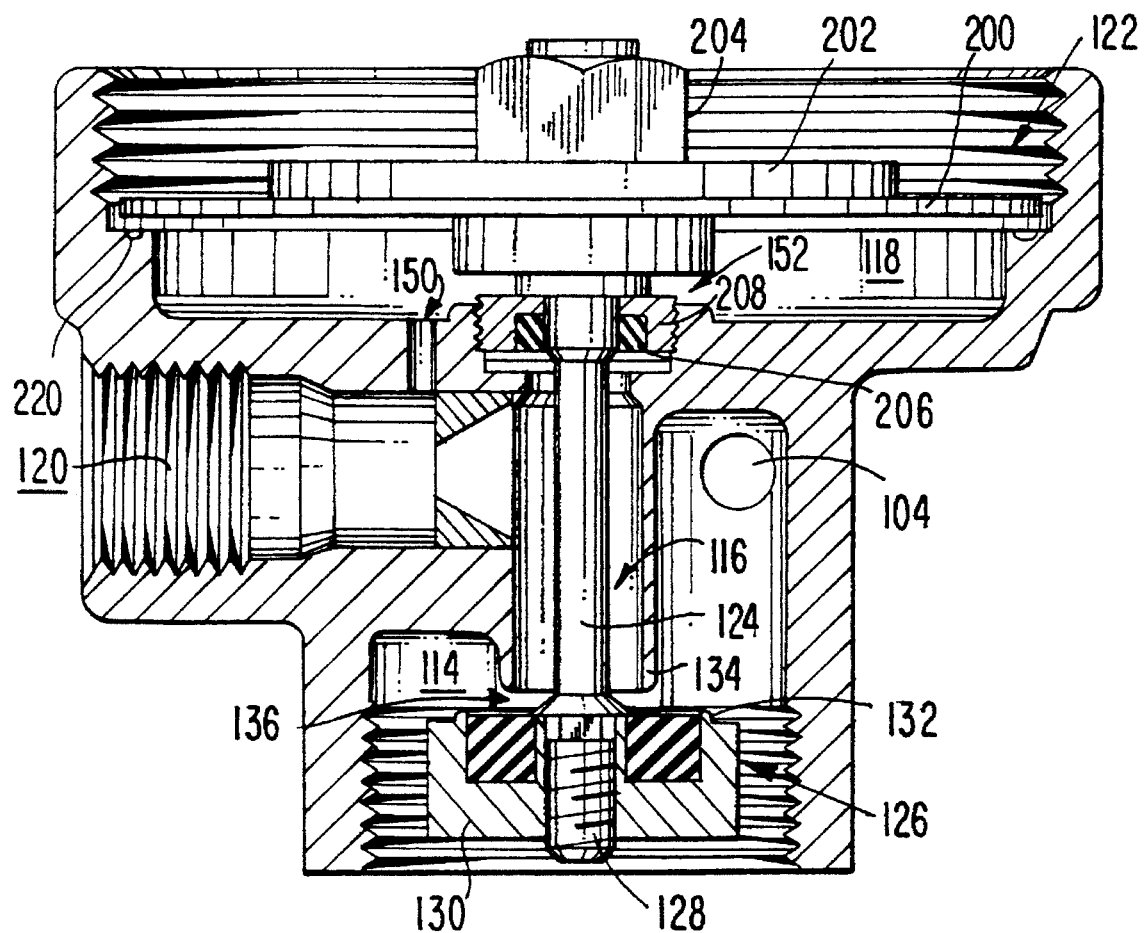
FIG. 3 is a section view taken along line 3—3 of FIG. 2, depicting in further detail the structure of the bottom portion of the first regulator means.

As best seen in FIG. 3, the intermediate pressure gas flows from passageway 104 into receiving chamber 114 of second regulator 20. It is then metered for flow upward through main vertical passageway 116 outward through exit ports 120 and through chamber passageway 150 into lower chamber 118. The construction of second regulator 20 is such that precise control over the intermediate pressure gas entering thereinto may be obtained over a wide range of flow rates.

In particular, and as best seen in FIGS. 1 and 3, diaphragm assembly 122, with flexible membrane 200, rigid backing plate assembly 202 and mounting nut 204, is mounted upon valve stem 124, which bears metering seat assembly 126 at its lower end, displaced from the diaphragm 122. Valve stem 124 has a threaded lower portion 128 which accepts metering nut 130. Metering nut 130 includes a resilient sealing insert ring 132 adapted to bear against the lower end of the cylindrical central wall 134 which defines the vertical passageway 116. The vertical positioning of valve stem 124 and metering nut 130 defines a variable area annular inlet 136 to passageway 116, the size of which controls the amount of gas, and hence its pressure, flowing into the passageway and subsequently out through the outlet ports 120. The nut 130 and sealing ring 132 are biased upwardly against the lower end of the wall 134 by the action of a tapered spring 138 (FIG. 1) mounted in tail plug 140 threaded into the sidewall of receiving chamber 114. O-ring 142 provides a gas-tight seal between the plug and receiving chamber.

Diaphragm 122, stem 124 and metering nut 130 are subject to a downward bias by main spring 144 located in the upper chamber 146 of the regulator. The bias upon the diaphragm and valve spring may be adjusted by an adjustment assembly 148 identical in operation to that provided with first regulator 16. By proper adjustment of the adjustment assembly, coupled with the choice of appropriate spring constants for main spring 144 and taper spring 138 as known in the art, the size of annular inlet 136 may be chosen to correspond to the desired exit pressure.

During operation, the pressure in lower chamber 118 is determined by the metered gas which enters through chamber passageway 150. Valve stem 124 passes through upper sealing seat 152, comprising sealing ring 206 and retainer 208, to prevent the gas in main vertical passageway 116 to flow into the lower chamber 118 along the stem. The peripheral edge of diaphragm flexible membrane 200 rests upon the top surface of shoulder 220 in regulator body portion 222, creating lower chamber 118 below the diaphragm. Body portion 222 includes internal threads 154 which mate with matching external threads 156 at the bottom of upper housing bonnet 158. Preferably, upper housing 158 and upper housing 48 for first regulator 16 are identical, except for the location of the threads. This allows the regulator assembly to be assembled from a minimal number of components.

A washer 160 seals the joining of the upper housing to the body portion 222 with the periphery of the diaphragm membrane 200 in place therebetween. Pressure changes in lower chamber 118 caused by gas flow displaces diaphragm 122 from its equilibrium position, resulting in vertical motion of valve stem 124 and thus variation in the size of annular inlet 136. Increased pressure in the lower chamber raises the diaphragm, causing the annular inlet to decrease in area, thus lowering the volume of gas flowing outward and accordingly the pressure upon the diaphragm. Regulation thus occurs about the equilibrium point.

The use of multiple output ports 120 for the regulated gas permits flexibility in coupling the regulator to gas supply systems. As shown in FIG. 2, one of the outlet ports may be capped with a safety regulator 162, as known in the art, comprising a solid stem 164 biased by a spring 166 against an internal shoulder in the output port with seal elements 212. In the event of regulator failure the stem is driven back, against the pressure of the spring, the over-pressure exiting through the bores 168 in the regulator cap 170 which is threaded into the outlet port. A similar safety 214 may be inserted into a bore 172 which connects with the chamber 114, the operating pressure for such safety 172 being chosen to provide over-pressure relief at the intermediate regulated pressure, providing redundancy with safety 108.

Another output port 120 may be provided with a connection fitting 174 to allow an output hose to be connected thereto, the fitting 174 being threaded into a mating internal thread in the bore. An internal nozzle 176 and spring 178 may also fit within the bore to provide an outward tension against the fitting to provide a tight, gas sealing fit between the mating threads.

By use of the foregoing two-stage regulator, the individual regulator portions of which are of different operating geometries, high precision over the control of gas pressure may be obtained over a variety of flow rates. By the use of common components mounted upon a unitary base, a design of simplified construction, lowered costs and operating economy may be achieved. A single bonnet construction, having a male mounting thread as incorporated into the low-pressure regulator portion, allows a diaphragm approximately 25 percent greater surface area to be used, in the low-pressure regulator, providing increased sensitivity and a greater flow rate. A relatively small diaphragm minimizes the load applied at high pressures to the main regulator spring and thus the bonnet, provides an increased safety margin during operation.

I claim:

1. A two-stage gas regulator for providing a low-pressure flow output from a high-pressure flow input, comprising: a unitary base, said base including a first section forming a lower portion of a first regulator unit and a second section forming a lower portion of a second regulator unit, each of said lower portions including a gas inlet and a gas outlet for each of said regulator units; a channel coupling said outlet of said first regulator unit to said inlet of said second regulator unit; first and second regulator bonnets mounted to said first and second lower portions, respectively, to form respective housings for said first and second regulator units., said first and second bonnets being of the same size, said first bonnet having interior threads for mounting upon said first base section and said second bonnet having exterior threads for mounting upon said second base section; and pressure control means comprising a diaphragm mounted within each of said first and second regulator unit housings for regulating a flow of gas passing therethrough, the pressure control means of said first regulator unit adapted to transform said high-pressure input to an intermediate pressure flow, the pressure control means of said second regulator unit adapted to transform said intermediate pressure flow to said low-pressure output, the surface area of said diaphragm unit being about 25 percent greater than the surface area of said diaphragm of said first regulator unit.

2. The regulator of claim 1, wherein said second pressure control means comprise a central stem depending from said diaphragm and terminating at a distal end, and a valve comprising a valve ring mounted to said stem distal end and a valve seat formed in said second section of said base, operation of said valve being controlled by deflection of said diaphragm.

3. The regulator of claim 2, wherein said inlet for said second regulator unit includes a receiving chamber in said base second section, said receiving chamber being coupled to the outlet for said second regulator unit through a vertical passageway having a sidewall terminating within said receiving chamber at the lower end, said valve seat comprising said lower end.

4. The regulator of claim 2, wherein said pressure control means further comprises an aspirator passageway between said second regulator unit outlet and a chamber having a fixed wall formed by said base second section and a moveable wall formed by a lower surface of said diaphragm.

5. The regulator of claim 1, wherein said first pressure control means comprise said diaphragm having a central core, and a metering valve mounted in said base first section adjacent said core and coupled to said core for valve action in response to motion thereof.

6. The regulator of claim 5, wherein said metering valve comprises a hollow valve body mounted within said base first section and having a lower seating member with a central bore; a plunger extending through said valve body and central bore having a tapered tail located proximate said central bore and a top end projecting upwardly from said valve body for contact with said diaphragm core, and biasing means in engagement with said tail for biasing said plunger upward for engagement with said core, said plunger being dimensioned to be vertically variably positionable with respect to said valve body in response to vertical motion of said plunger, whereby the spacing between said tail and said central bore varies in response to said motion to provide a variable-sized aperture therebetween.

7. The regulator of claim 4, wherein said second regulator unit outlet includes a reduced cross-sectional neck portion located upstream of said aspirator passageway.

8. The regulator of claim 3 further comprising a bias spring located in said receiving chamber for biasing said valve ring against said valve seat.

9. The regulator of claim 8, wherein said receiving chamber comprise a threaded sidewall formed within said second base section and a removable end wall-forming cap having a threaded portion engageable with said threaded sidewall, said bias spring being in a compressed state between said cap and said valve ring.

10. The regulator of claim 1 further comprising first and second over pressure safety valves located in the outlet of said first regulator unit.

11. The regulator of claim 10 further comprising an over-pressure safety valve located in the outlet of said second regulator unit.

12. The regulator of claim 1, wherein said unitary base includes an integral mounting flange between said first and second regulator base-forming sections.

13. A two-stage gas regulator for providing a low-pressure flow output from a high-pressure flow input, comprising a unitary base, said base including a first section forming a lower portion of a first regulator unit and a second section forming a lower portion of a second regulator unit, each of said lower portions including a gas inlet and a gas outlet for each of said regulator units; an integral mounting flange between said first and second regulator base-forming sections; a channel within said base coupling said outlet of said first regulator unit to said inlet of said second regulator unit; first and second regulator bonnets mounted to said first and second lower portions respectively to form respective housings for said first and second regulator units; and a pressure control means mounted within each of said first and second regulator unit housings for regulating a flow of gas passing therethrough, the pressure control means of said first regulator unit adapted to transform said high-pressure input to an intermediate pressure flow, the pressure control means of said second regulator unit adapted to transform said intermediate pressure flow to said low-pressure output, said first pressure control means comprising a pressure-responsive diaphragm biased by a main pressure spring, said diaphragm comprising a central core, and a metering valve mounted in said base first section adjacent said core and coupled for valve action thereto, said second pressure control means comprising a pressure-responsive diaphragm biased by a main pressure spring, a central stem depending from said diaphragm and terminating at a distal end, and a cooperating valve comprising a valve ring mounted to said stem distal end and a valve seat formed in said second section of said base, operation of said valve being controlled by deflection of said diaphragm.

14. The regulator of claim 13, wherein said first and second bonnets are of the same size, said first bonnet having interior threads for mounting upon said first base section, said second bonnet having exterior threads for mounting upon said second base section.

15. The regulator of claim 14, wherein the surface area of said diaphragm of said second regulator unit is about 25 percent greater than the surface area of said diaphragm of said first regulator unit.

16. The regulator of claim 13, wherein said inlet for said second regulator unit includes a receiving chamber in said base second section, said receiving chamber being coupled to the outlet for said second regulator unit through a vertical passageway having a sidewall terminating within said receiving chamber at a lower end, said valve seat comprising said sidewall lower end, said pressure control means further comprising an aspirator passageway between said second regulator unit outlet and a chamber having a fixed wall formed by said base second section and a moveable wall formed by a lower surface of said diaphragm.

17. The regulator of claim 16, wherein said regulator unit outlet includes a reduced cross-sectional neck portion located upstream of said aspirator passageway.

18. The regulator of claim 17 further comprising first and second over pressure safety valves located in the outlet of said first regulator unit.

19. The regulator of claim 18 further comprising an over-pressure safety valve located in the outlet of said second regulator unit.

20. A two-stage gas regulator for providing a low-pressure flow output from a high-pressure flow input, comprising: a unitary base, said base including a first section forming a lower portion of a first regulator unit and a second section forming a lower portion of a second regulator unit, each of said lower portions including a gas inlet and a gas outlet for each of said regulator units; a channel coupling said outlet of said first regulator unit to said inlet of said second regulator unit; first and second regulator bonnets mounted to said first and second lower portions, respectively, to form respective housings for said first and second regulator units, said first and second bonnets being of the same size, said first bonnet having interior threads for mounting upon said first base section and said second bonnet having exterior threads for mounting upon said second base section; said pressure control means comprising a diaphragm mounted within each of said first and second regulator unit housings for regulating a flow of gas passing therethrough, the pressure control means of said first regulator unit adapted to transform said high-pressure input to an intermediate pressure flow, the pressure control means of said second regulator unit adapted to transform said intermediate pressure flow to said low-pressure output, said pressure control means of second regulator unit further comprising an aspirator passageway between one of said regulator unit outlets coupled to a chamber having a fixed wall formed by said base second section and a movable wall formed by a lower portion of the diaphragm of said one of said regulator units, and a flow acceleration nozzle having a smoothly tapered inner wall located upstream of said aspirator passageway.

21. A two-stage gas regulator for providing a low-pressure flow output from a high-pressure flow input, comprising: a unitary base, said base including a first section forming a lower portion of a first regulator unit and a second section forming a lower portion of a second regulator unit, each of said lower portions including a gas inlet and a gas outlet for each of said regulator units; a channel coupling said outlet of said first regulator unit to said inlet of said second regulator unit; first and second regulator bonnets mounted to said first and second lower portions, respectively, to form respective housings for said first and second regulator units, said first and second bonnets being of the same size, said first bonnet having interior threads for mounting upon said first base section and said second bonnet having exterior threads for mounting upon said second base section; and pressure control means comprising a diaphragm mounted within each of said first and second regulator unit housings for regulating a flow of gas passing therethrough, the pressure control means of said first regulator unit adapted to transform said high-pressure input to an intermediate pressure flow, the pressure control means of said second regulator unit adapted to transform said intermediate pressure flow to said low-pressure output, said metering valve comprising a hollow valve body mounted within said base first section and having a lower seating member with a central bore; a plunger extending through said valve body and central bore having a tapered tail located proximate said central bore and a top end projecting upwardly from said valve body for contact with said diaphragm core, and biasing in engagement with said tail for biasing said plunger upward for engagement with said core, said plunger being dimensioned to be vertically, variably positionable with respect to said valve body in response to vertical motion of said plunger, whereby the spacing between said tail and said central bore varies in response to said motion to provide a variable-sized aperture therebetween.

22. The regulator of claim 20, wherein said first pressure control means comprise said diaphragm having a central core, and a metering valve mounted in said base first section adjacent said core and coupled to said core for valve action in response to motion thereof.

23. The regulator of claim 22, wherein said metering valve comprises a hollow valve body mounted within said base first section and having a lower seating member with a central bore; a plunger extending through said valve body and central bore having a tapered tail located proximate said central bore and a top end projecting upwardly from said valve body for contact with said diaphragm core, and biasing means in engagement with said tail for biasing said plunger upward for engagement with said core, said plunger being dimensioned to be vertically variably positionable with respect to said valve body in response to vertical motion of said plunger, whereby the spacing between said tail and said central bore varies in response to said motion to provide a variable-sized aperture therebetween.

\* \* \* \* \*